(12) United States Patent
Ramachandran et al.

(10) Patent No.: US 7,366,416 B2
(45) Date of Patent: Apr. 29, 2008

(54) HUB FOR A PASSIVE OPTICAL NETWORK HUB

(75) Inventors: Mani Ramachandran, San Jose, CA (US); Chandra Sekhar Jasti, Cupertino, CA (US)

(73) Assignee: General Instrument Corporation, Horsham, PA (US)

( * ) Notice: Subject to any disclaimer, the term of this patent is extended or adjusted under 35 U.S.C. 154(b) by 582 days.

(21) Appl. No.: 10/638,954

(22) Filed: Aug. 11, 2003

(65) Prior Publication Data

US 2005/0036786 A1 Feb. 17, 2005

(51) Int. Cl.
*H04J 14/00* (2006.01)

(52) U.S. Cl. .............................. 398/71; 398/66; 398/67; 398/68; 398/70; 398/72; 398/58; 398/59; 398/79; 398/82; 398/83; 398/33; 398/38; 398/37; 398/92; 398/147; 398/157; 398/158; 398/160; 398/177; 398/192; 398/197; 385/24; 385/39; 385/37

(58) Field of Classification Search ................ 398/58, 398/59, 70, 82, 83, 24, 39, 66, 67, 68, 71, 398/72, 79, 33, 38, 37, 92, 147, 157, 158, 398/160, 177, 192, 197; 385/24, 39, 37
See application file for complete search history.

(56) References Cited

U.S. PATENT DOCUMENTS

| | | | |
|---|---|---|---|
| 5,321,707 A * | 6/1994 | Huber | 372/6 |
| 5,864,644 A | 1/1999 | DiGiovanni et al. | 385/43 |
| 5,907,417 A | 5/1999 | Darcie et al. | 359/110 |
| 5,914,799 A * | 6/1999 | Tan | 398/92 |
| 6,104,733 A | 8/2000 | Espindola et al. | 372/6 |
| 6,181,466 B1 * | 1/2001 | Franzoso et al. | 359/341.3 |
| 6,278,816 B1 | 8/2001 | Keur et al. | 385/29 |
| 6,351,582 B1 | 2/2002 | Dyke et al. | 385/24 |
| 6,381,047 B1 | 4/2002 | Frigo et al. | 359/124 |
| 6,434,295 B1 * | 8/2002 | MacCormack et al. | 385/27 |
| 2004/0076371 A1 * | 4/2004 | Bellemare et al. | 385/24 |

* cited by examiner

Primary Examiner—Hanh Phan
(74) Attorney, Agent, or Firm—Larry T. Cullen (57) ABSTRACT

A hub for use in a passive optical network (PON) includes a transmission fiber on which an information-bearing optical signal is received, a double-cladded, rare-earth doped fiber located along the transmission fiber for imparting gain to the information-bearing optical signal, and a combiner having an output coupled to the transmission fiber and a plurality of inputs. The output is coupled to the transmission fiber such that optical energy at pump energy wavelengths but not signal wavelengths are communicated therebetween. At least one pump source is optically coupled to one of the inputs of the combiner for providing optical pump energy to the double-cladded, rare-earth doped fiber. An optical splitter is also provided. The optical splitter has an input coupled to the transmission fiber for receiving an amplified, information-bearing optical signal and a plurality of outputs for directing portions of the amplified, information-bearing optical signal to remote nodes in the PON.

41 Claims, 7 Drawing Sheets

HUB FOR A PASSIVE OPTICAL NETWORK HUB

FIELD OF THE INVENTION

The present invention relates generally to passive optical networks, and more particularly to a passive optical network having a hub or head end that employs a cladding pumped erbium doped optical amplifier.

BACKGROUND OF THE INVENTION

Optical networks that employ passive architectures are often referred to as Passive Optical Networks (PONs). Such networks use some form of passive component such as an optical star coupler or a static wavelength router and thus do not have any active switching elements. A primary advantage of a PON is its reliability, ease of maintenance and the fact that the field-deployed network does not need to be powered. Accordingly, PONs are often used as access networks by cable TV and telecommunications providers for the purpose of distributing their services from their facility to the customer premises (e.g., a home or business).

Figure 1:
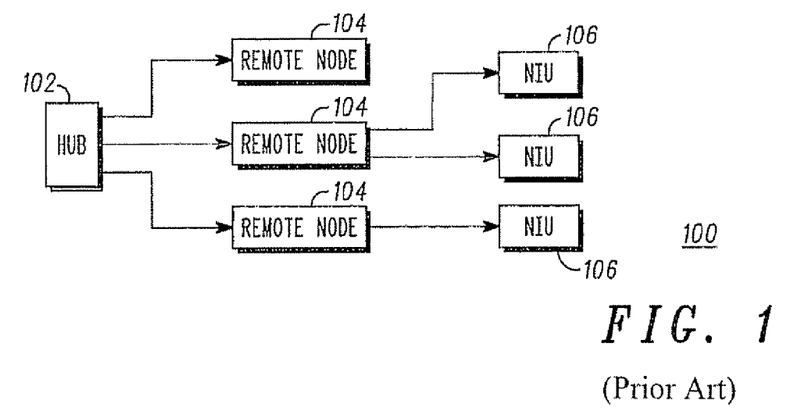
FIG. 1 shows the high-level architecture of a conventional PON.

FIG. 1 shows the architecture of a PON in its most generalized form. The PON 100 includes a hub 102, remote nodes 104 that are deployed in the field, and network interface units (NIUs) 106. The hub 102, remote nodes 104 and NIUs 106 are in communication with one another over optical fiber links. If the PON 100 is a telecommunications network, hub 102 is a central office. If the PON 100 is a CATV network, hub 102 is generally called a head end. The NIUs 106 may be terminal equipment located on the customer premises or they may serve multiple customers, in which case the NIUs 106 simply provide another level in the network hierarchy below the remote nodes.

Figure 2:
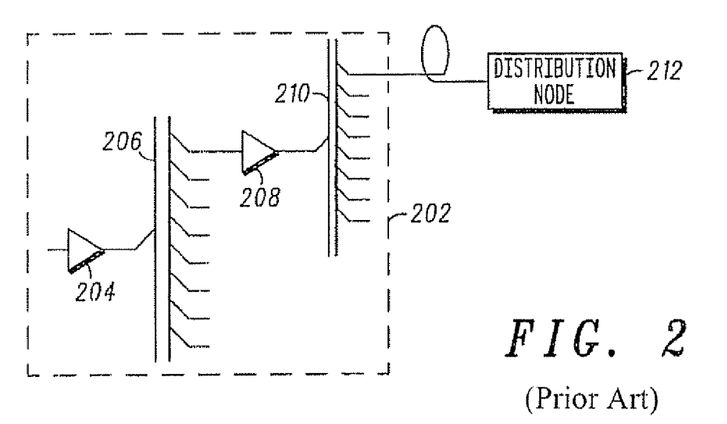
FIG. 2 shows a portion of a conventional PON that is sometimes employed in a cable TV system.

FIG. 2 shows a portion of a conventional PON 200 that is sometimes employed in a cable TV system. PON 200 includes a head end 202 having a driver amplifier 204, a 1×N splitter 206 and a high power optical amplifier 208 that is coupled to one of the outputs of splitter 206. As explained below, additional optical amplifiers (not shown) may be coupled to the remaining outputs of the splitter 206 as the capacity of the network is increased. Finally, the output of the high power optical optical amplifier 208 is coupled to an input of a second 1×N splitter 210. Each output from the splitter 210 is coupled to a remote node 212, which may be located in the field or on customer premises.

In operation, driver amplifier 204 typically receives an optical signal with about 1-4 mw of power and provides an amplified optical signal with about 100 mw of power to the 1×N splitter 206. If 1×N splitter 206 is an 1×8 splitter, high power optical amplifier 208 receives an optical signal with about 10-12 mw of power, after losses in the splitter are taken into account. In turn, the high power optical amplifier 208 provides an optical signal to the second splitter 210.

Driver amplifier 204 and high power amplifier 208 are generally rare-earth doped fiber amplifiers that use rare-earth ions as the active element. The ions are doped in a fiber core and pumped optically to provide gain. While many different rare-earth ions can be used to provide gain in different parts of the spectrum, erbium-doped fiber amplifiers (EDFAs) have proven to be particularly attractive because they are operable in the spectral region where optical loss in the fiber is minimal. Because of the electronic structure of the erbium ion, EDFAs can be pumped with optical energy at a wavelength of 980 nm or 1480 nm. Driver amplifier 204 is typically supplied with pump energy at 980 nm to achieve a lower noise figure and high power amplifier 208 is generally supplied with pump energy at 1480 nm to achieve higher output power (at the expense of an increase in noise relative to the driver amplifier 204).

One advantage of the arrangement shown in FIG. 2 is its scalability. That is, as demand for service grows, additional high power optical amplifiers can be added to the remaining unused outputs of the 1×N splitter 206. The driver amplifier 204 and splitter 206 are generally located in a common chassis and the high power optical amplifiers are modules that plug into the chassis. Thus, increasing capacity simply requires the provision of additional modules into the chassis. Moreover, capacity can be increased in this manner without any interruption in service. This arrangement is also highly reliable and requires minimal upfront cost. One disadvantage of this arrangement, however, is that as demand continues to grow, the increasing number of high power amplifier modules that are required makes the head end increasingly expensive.

Accordingly, it would be desirable to provide a scalable passive optical network whose capacity can be increased in a relatively inexpensive manner.

SUMMARY OF THE INVENTION

In accordance with the present invention, a hub is provided for use in a passive optical network (PON). The hub includes a transmission fiber on which an information-bearing optical signal is received, a double-cladded, rare-earth doped fiber located along the transmission fiber for imparting gain to the information-bearing optical signal, and a combiner having an output coupled to the transmission fiber and a plurality of inputs. The output is coupled to the transmission fiber such that optical energy at pump energy wavelengths but not signal wavelengths are communicated therebetween. At least one pump source is optically coupled to one of the inputs of the combiner for providing optical pump energy to the double-cladded, rare-earth doped fiber. An optical splitter is also provided. The optical splitter has an input coupled to the transmission fiber for receiving an amplified, information-bearing optical signal and a plurality of outputs for directing portions of the amplified, information-bearing optical signal to remote nodes in the PON.

In accordance with one aspect of the present invention, the PON is CATV access network.

In accordance with another aspect of the invention, the rare-earth doped fiber is an erbium doped fiber.

In accordance with another aspect of the invention, the rare-earth doped fiber is an erbium and yttrium doped fiber.

In accordance with another aspect of the invention, the pump source is a multimode pump source.

In accordance with another aspect of the invention, an initial optical amplifier is also provided. The initial optical amplifier provides the information-bearing optical signal onto the transmission fiber.

In accordance with another aspect of the invention, a plurality of pump sources are respectively coupled to the plurality of inputs of the combiner.

In accordance with another aspect of the invention, a hub is provided for use in a passive optical network (PON) The hub includes a transmission fiber on which an information-bearing optical signal is received, a double-cladded, rare-earth doped fiber located along the transmission fiber for imparting gain to the information-bearing optical signal, and a combiner having an output coupled to the transmission fiber and a plurality of inputs. The output of the combiner is coupled to the transmission fiber such that optical energy at pump energy wavelengths but not signal wavelengths are communicated therebetween. At least one integrated pump source/splitter module is optically coupled to one of the inputs of the combiner for providing optical pump energy to the double-cladded, rare-earth doped fiber. A first optical splitter has an input receiving the amplified, information-bearing optical signal from the doped fiber and a plurality of outputs. At least one of the outputs is coupled to the integrated pump source/splitter module. A second optical splitter has an input coupled to a splitter output of the integrated pump source/splitter and a plurality of outputs for directing portions of the amplified, information-bearing optical signal to remote nodes in the PON.

In accordance with another aspect of the invention, a hub is provided for use in a passive optical network (PON). The hub includes a transmission fiber on which an information-bearing optical signal is received, a double-cladded, rare-earth doped fiber located along the transmission fiber for imparting gain to the information-bearing optical signal, and a combiner having an output coupled to the transmission fiber and a plurality of inputs. The output of the combiner is coupled to the transmission fiber such that optical energy at pump energy wavelengths but not signal wavelengths are communicated therebetween. At least one integrated pump source/splitter module is optically coupled to one of the inputs of the combiner for providing optical pump energy to the double-cladded, rare-earth doped fiber. A first variable ratio coupler (VRC) has first and second outputs and an input receiving the amplified, information-bearing optical signal from the doped fiber. A first of the outputs of the VRC is coupled to a splitter input of the integrated pump source/splitter module. An optical splitter has an input coupled to a splitter output of the integrated pump source/splitter module and a plurality of outputs for directing portions of the amplified, information-bearing optical signal to remote nodes in the PON.

In accordance with another aspect of the invention, a hub is provided for use in a passive optical network (PON). The hub includes a transmission fiber on which an information-bearing optical signal is received, a double-cladded, rare-earth doped fiber located along the transmission fiber for imparting gain to the information-bearing optical signal, and a combiner having an output coupled to the transmission fiber and a plurality of inputs. The output of the coupler is coupled to the transmission fiber such that optical energy at pump energy wavelengths but not signal wavelengths are communicated therebetween. At least one integrated pump source/splitter module is optically coupled to one of the inputs of the combiner for providing optical pump energy to the double-cladded, rare-earth doped fiber. The module includes a pump source, a first optical splitter and a first 1×N optical switch having N inputs, where N is an integer greater than or equal to two, and an output coupled to an input of the optical splitter. A second 1×N optical switch has N outputs and an input receiving the amplified, information-bearing optical signal from the doped fiber. (N–1) second optical splitters each having an input respectively coupled to one of the outputs of the second optical switch, wherein each of the second optical splitters i, where i=1 to (N–1), have i+1 outputs, wherein each input of the first optical switch is sequentially coupled to an output of a different one of the second optical splitters. A third optical splitter has an input coupled to a splitter output of the first optical splitter in the integrated pump source/splitter module and a plurality of outputs for directing portions of the amplified, information-bearing optical signal to remote nodes in the PON.

DETAILED DESCRIPTION

The present inventor has recognized that the hub of a passive optical network (PON) can be reduced in cost by replacing the conventional EDFAs that serve as the high power amplifiers with cladding pumped EDFAs. As explained below, cladding pumped EDFAs can use less expensive, multimode pump sources instead of the more expensive single mode pump sources required by conventional EDFAs.

Cladding pumped EDFAs overcome a problem that arises in a conventional EDFA when attempting to increase their output power by increasing the pump power with which they are supplied. Generally, the pump source is a laser diode. A common way of increasing the output power of the laser diode is to increase its emitting area. This makes it possible to increase the power without increasing the power density at the output facet of the device. Unfortunately, the resulting broad-area laser diode is multimode, and its output is no longer sufficiently coherent to be coupled into a single-mode fiber. Such a diode can, however, be coupled into a multi-mode fiber to provide an essentially incoherent, high power multimode source.

A typical cladding-pumped fiber device comprises a single-mode core and a plurality of cladding layers. The inner cladding surrounding the core is typically a silica cladding of large cross-sectional area (as compared to the core) and high numerical aperture. It is usually non-circular (rectangular or star-shaped) to ensure that the modes of the inner cladding will have good overlap with the core. The outer cladding is commonly composed of a low refractive index polymer. The index of the core is greater than that of the inner cladding which, in turn, is greater than the outer cladding.

A major advantage of the cladding pumped fiber is that it can convert light from low-brightness, multimode sources into light of high brightness in a single mode fiber. Light from low brightness sources such as diode arrays can be coupled into the inner cladding due to its large cross-sectional area and high numerical aperture. Such multimode sources have the advantage of being significantly less expensive than single mode pump sources.

Figure 3:
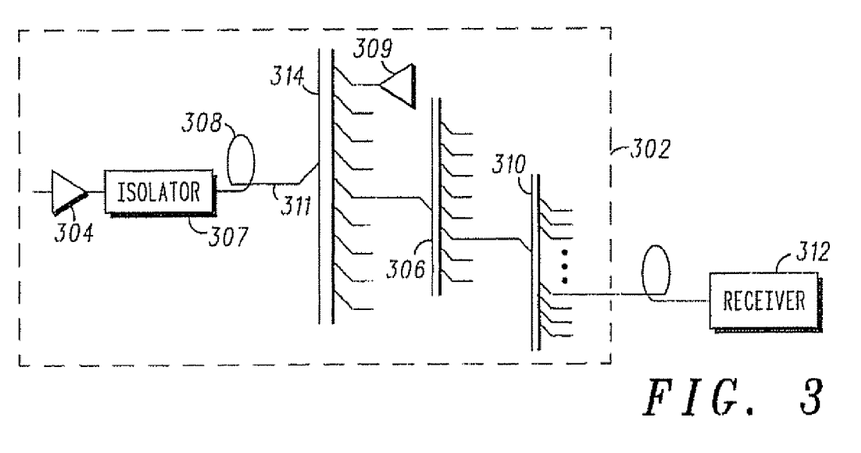
FIG. 3 shows a hub for use in a PON constructed in accordance with the present invention.

FIG. 3 shows a hub for use in a PON constructed in accordance with the present invention. While for purposes of illustration only the hub will be sometimes referred to as a head end for a PON employed in a CATV network, those of ordinary skill in the art will recognize that the invention could also serve as the hub for any PON in a telephone access system, for example. In comparison to FIG. 2, the head end 302 in FIG. 3 replaces the high power optical amplifiers 208 with a cladding pumped EDFA that comprises a single, double-cladded doped fiber 308 and one or more pump sources 309 (only one of which is shown in FIG. 3), which advantageously may be multimode pump sources. A combiner 314 is used to couple the pump energy from the pump sources 309 to signal fiber 311. The doped fiber 308, which is located at an intermediate point along the signal fiber 311, amplifies the signal using the pump energy it receives from the pump sources 309 via the combiner 314. An isolator 307 is provided between the driver amplifier 304 and the doped fiber 308 to prevent counter-propagating pump energy from reaching the driver amplifier 304.

The combiner 314 may be built into the backplane of the head end chassis. In this embodiment of the invention the modules that are inserted into the chassis are simply pump source modules rather than optical amplifier modules.

One important advantage of the hub 302 shown in FIG. 3 is that as the demand for service grows, the service provider only needs to add additional pump sources 309 to the available input ports of the combiner 314 to achieve an incremental increase in output power. This leads to a cost reduction for two reasons. First, unlike in FIG. 2, in FIG. 3 only a pump source needs to be added whereas in FIG. 2 a complete optical amplifier (the pump source and the doped fiber) needs to be added to achieve an incremental increase in output power. Second, pump sources 309 may be multimode pumps, which are less expensive than the single mode pump sources required by the hub in FIG. 2.

It should be noted that while the pump source 309 and combiner 314 are arranged in FIG. 3 so that the doped fiber 308 is counter-pumped, the invention also contemplates a similar arrangement in which the doped fiber 308 is co-pumped.

One disadvantage of the head end 302 shown in FIG. 3 arises because all the optical signals are amplified by the cladding pumped EDFA on the signal fiber 311 before the signal reaches the splitters 306 and 310. As a result, as additional pump sources 309 are added to the system, the power of the optical signals being transmitted to all the customers via splitters 306 and 310 is increased. In contrast, if an optical amplifier 208 is added in FIG. 2 to increase capacity, the power level of the signals being amplified by the previously installed optical amplifiers 208 will be unchanged. Accordingly, whenever pump sources are added in the embodiment of the invention shown in FIG. 3, the customer will need to make appropriate adjustments to the network such as rearranging splitter loss to accommodate the increase in signal power. As result, the PON will necessarily experience some operational downtime whenever capacity is increased in this manner. This problem is overcome with the embodiment of the invention depicted in FIG. 4.

Figure 4:
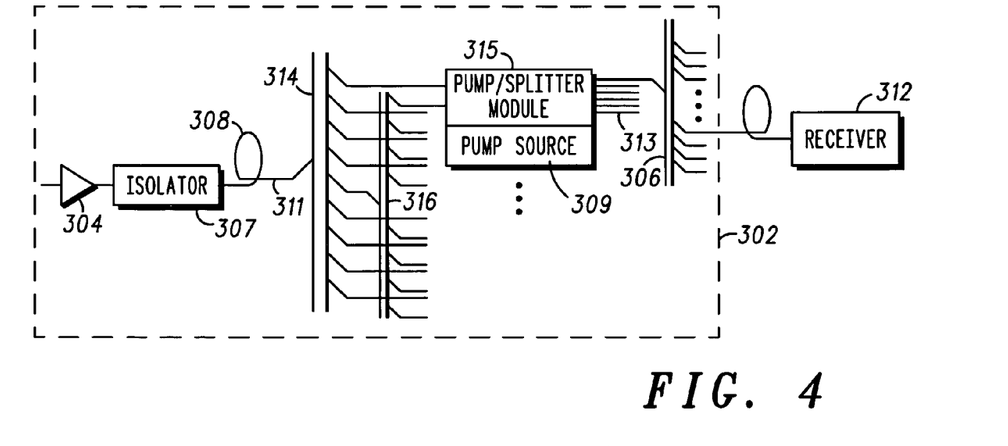
FIGS. 4-8 show various alternative embodiments of the hub constructed in accordance with the present invention.

In FIGS. 3 and 4, as well as the figures that follow, like elements are denoted by like reference numerals. In FIG. 4 pump energy is supplied from the pump sources 309 to doped fiber 308 in the same manner as in FIG. 3. However, in FIG. 4 a 1×N splitter 316 is also provided, which has an input port that receives the amplified optical signals from the doped fiber 308. Also, pump source 309 now includes an integrated splitter 313 located in the same module as the pump source 309, thereby forming a pump/splitter module 315. That is, in this embodiment of the invention the modules that are inserted into the chassis are pump/splitter modules rather than the pump modules employed in FIG. 3. In this embodiment of the invention both the combiner 314 and the splitter 316 may be located in the backplane of the head end chassis.

As shown, one of the output ports of the splitter 316 on which a portion of the optical signal is now carried is coupled to an input of the splitter in the pump/splitter module 315. Likewise, as additional pump/splitter modules 315 are added as the demand for capacity increases the pump/splitter modules 315 will be coupled to an unused input of the combiner 314 (for supplying pump energy) and to an unused output of the splitter 316 (to receive a portion of the optical signal). In this way the power level of the signals provided by previously installed ones of the pump/splitter module 315 will not be affected when capacity is increased.

Figure 5:
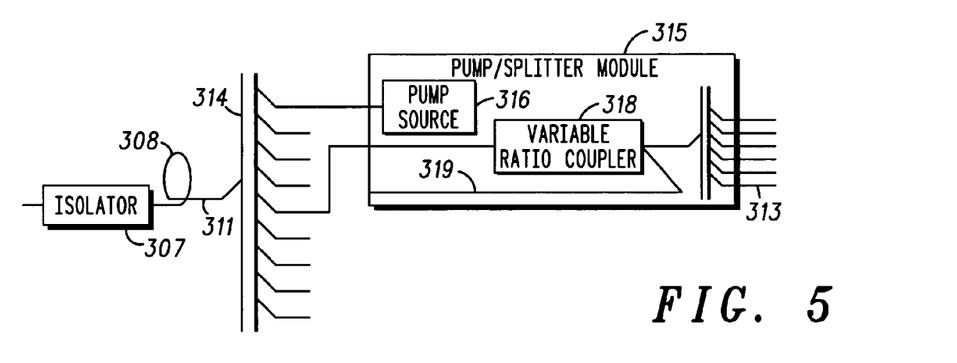

FIG. 5 shows another embodiment of the invention that avoids the need for the splitter 316 used in FIG. 4 while still maintaining the power level of the signals provided by previously installed ones of the pump/splitter module 315 when capacity is increased. As shown, the amplified optical signals received from doped fiber 308 on signal fiber 311 are directed to a pump/splitter module 315 of the type depicted in FIG. 4. Pump/splitter module 315 includes pump source 316 and splitter 313. Of course, in FIG. 5 as more pump/splitter modules 315 are added to unused output ports of the combiner 314, the power level of the amplified optical signals received by each of the pump/splitter modules 315 will increase. This problem can be overcome by adding a variable ratio coupler (VRC) 318 to the input of the splitter 313 in the pump/splitter modules 315. The VRC 318 has an input that receives the amplified optical signals from signal fiber 311 and two outputs. The first output directs a portion of the amplified optical signals to the splitter 313 and the second output directs the remaining portion of the amplified optical signals to a tap fiber 319 for elimination. The VRC 318 has a variable coupling ratio, which determines the distribution of power between its two outputs. In this way the signal power provided to the splitter 313 can be maintained at a constant level even as additional pump/splitter modules 315 are added to the head end. This is accomplished simply by adjusting the coupling ratio of the variable ratio coupler 318 so that any excess optical power is directed to the tap fiber 319. While the PON will still experience some downtime in order to adjust the coupling ratio of the VRC 318 when additional pump/splitter modules 315 are added, presumably this downtime can be kept to a minimum and will be less than the downtime experienced with the embodiment of the invention shown in FIG. 3.

Figure 6:
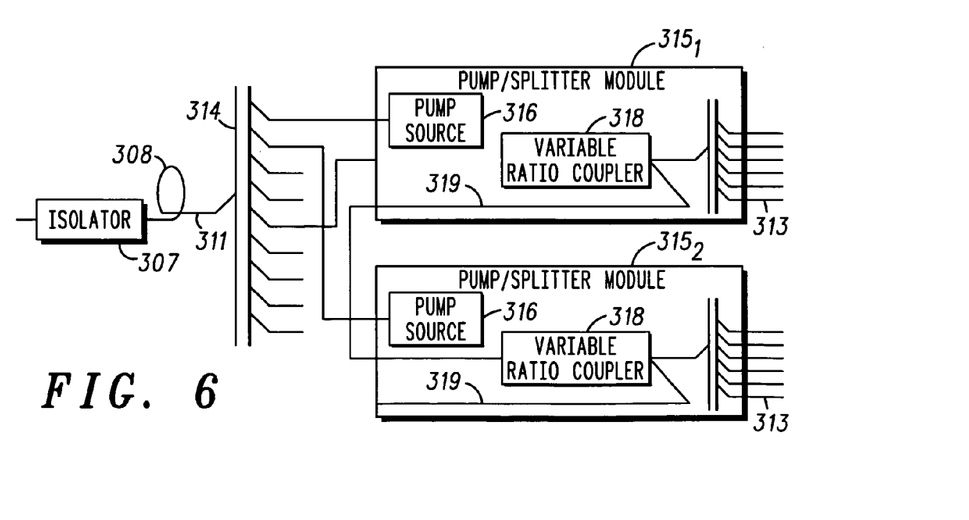

One problem with all the aforementioned embodiments of the invention is that there is a substantial waste of optical power through the unused output ports of the splitters (i.e., the unused output port of splitters 306 in FIG. 3; the unused output ports of splitter 316 in FIG. 4; and the tap fiber 319 in FIG. 5). FIG. 6 shows yet another embodiment of the invention that avoids such wastage by reusing excess optical power that arises when additional pump/splitter modules 315 are added.

FIG. 6 is similar to FIG. 5 except that in FIG. 6 two pump/splitter modules $315_1$ and $315_2$ are shown. Also, in FIG. 6, the tap fiber 319 of the first pump/splitter module $315_1$ is coupled to the input of the VRC 318 of the second pump/splitter module $315_2$. In this way excess optical signal power that is unused by the first pump/splitter module $315_1$ can be used by the second pump/splitter module $315_2$. Likewise, if a third pump/splitter module 315 (not shown in FIG. 6) is added to an unused output port of combiner 314, excess optical signal power that is not used by the second pump/splitter module $315_2$ can be used by the third pump/splitter module by coupling the tap fiber 319 of the second pump splitter module $315_2$ to the input of the VRC 318 of the third pump/splitter module. By establishing in this manner a daisy chain between the tap fiber output of each VRC 318 with the input of the VRC 318 in the successive coupler/splitter module 315, the amount of signal power that goes unused can be substantially reduced or even eliminated.

Figure 7:
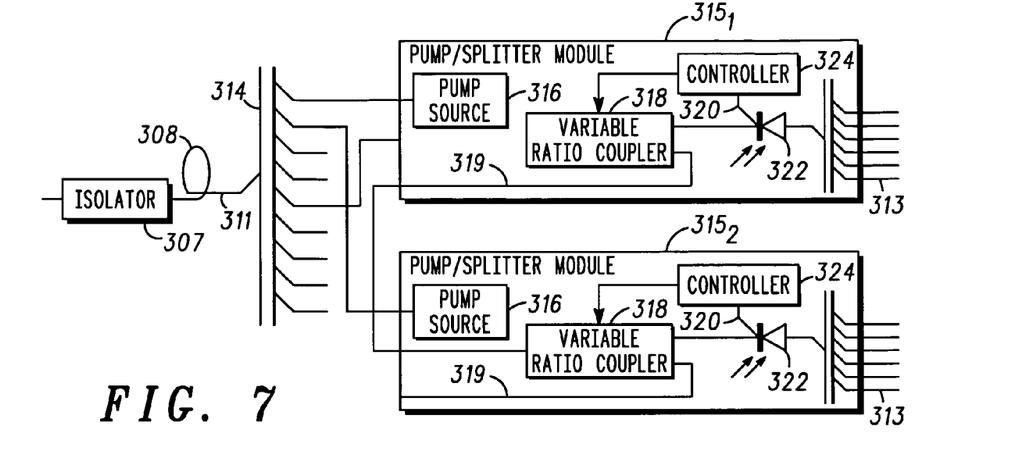

FIG. 7 shows a further enhancement of the present invention that may be employed in connection with either of the embodiments shown in FIGS. 5 and 6. In this embodiment the coupling ratio of the VRCs 318 are automatically adjusted when the optical signal power varies as a result of adding (or removing) pump/splitter modules 315, thereby reducing operational downtime. As shown, the pump/splitter modules 315 include a photodiode 322 that receives, via a tap 320, a small portion of the optical signal power being directed from the output of the VRC 318 to the input of the splitter 313. The photodiode 322 monitors the power level of the optical signal being directed to the splitter 313 and sends an electrical reference signal to a controller 324. The VRC 318 is connected to the controller 324 so that control signals sent from the controller to the VRC 318 varies the coupling ratio of the VRC 318. The controller 324 is programmed (via software, firmware, hardware, or any combination thereof) to adjust the coupling ratio of the VRC 318 so that the photodiode 320 always detects the same amount of optical power. In this way, if an additional pump/splitter module 315 is added to the head end so that the power level of the optical signals being monitored by the photodiode 320 increases, the controller 324 in any given one of the previously installed pump/splitter modules 315 will send a control signal to its VRC 318 to adjust the coupling ratio so that the optical power being monitored is reduced, while the optical power being directed by the VRC 318 to the tap fiber is increased. This change in the coupling ratio will result in more excess optical power being directed from the tap fiber 319 of each pump/splitter module 315 to its subsequent pump/splitter module.

One limitation of the embodiments of the invention shown in FIGS. 6 and 7 is that if one of the pump/splitter modules 315 becomes inoperable, all subsequent downstream modules 315 will be adversely impacted because they will not receive the optical signal from the inoperable module 315. This problem is overcome with the embodiment of the invention shown in FIG. 8 in which two 1×N optical switches 330 and 340 are employed. While in the particular embodiment of the invention depicted in FIG. 8 N is equal to 8, those ordinary skill in the art will recognize that N may be any integer greater than 2. As shown, optical switch 330 is located in the head end chassis and receives at its input the amplified optical signal from the doped fiber 308. In addition to the optical switch 330, N splitters $350_1$, $350_2$, ... $350_N$ are also provided in the head end chassis. It should be noted that while for simplicity of presentation reference numeral $350_1$ is referred to as a splitter, it is actually a single fiber, which for purposes herein may be considered a splitter with a single input and output port.

Each splitter $350_i$ has i output ports. For instance, splitter $350_4$ has 4 output ports and splitter $350_8$ has 8 output ports. As further shown in FIG. 8, the input port of each splitter 350 is sequencially coupled to the output ports of the 1×N optical switch 330. Thus, in operation, when optical switch 350 is switched to its fifth output, for instance, the amplified optical signal is directed to the input of the five-port splitter $350_5$.

Figure 8:
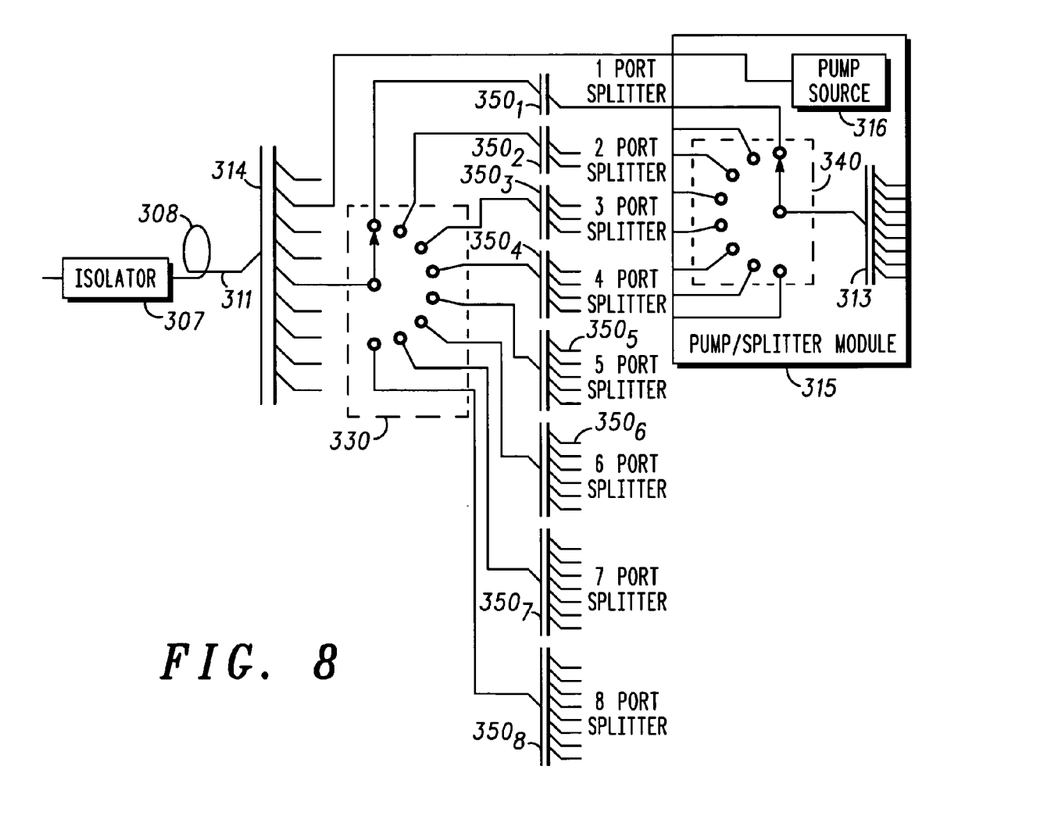

1×N optical switch 340 is located in the pump splitter/module 315. Optical switch 340 is arranged so that its N input ports are sequentially coupled to an output of the N splitters 350 (i.e., input port j of optical switch 340 is coupled to an output of splitter $350_j$). The output of optical switch 340 is coupled to the input of the splitter 313 that is integrated with pump/splitter module 315.

When, as in FIG. 8, only a single pump/splitter module 315 is employed, optical switch 330 located in the head end chassis is switched to its first output position so that the amplified optical signal is directed to splitter (i.e. optical fiber) $350_1$. Likewise, optical switch 340 located in pump/splitter module 315 is switched to its first input position so that it received the amplified optical signal form splitter $350_1$ and directs it to the splitter 313. Optical switches 330 and 340 may be configured annually, or alternatively, they may be configured automatically using microprocessor control.

Figure 9:
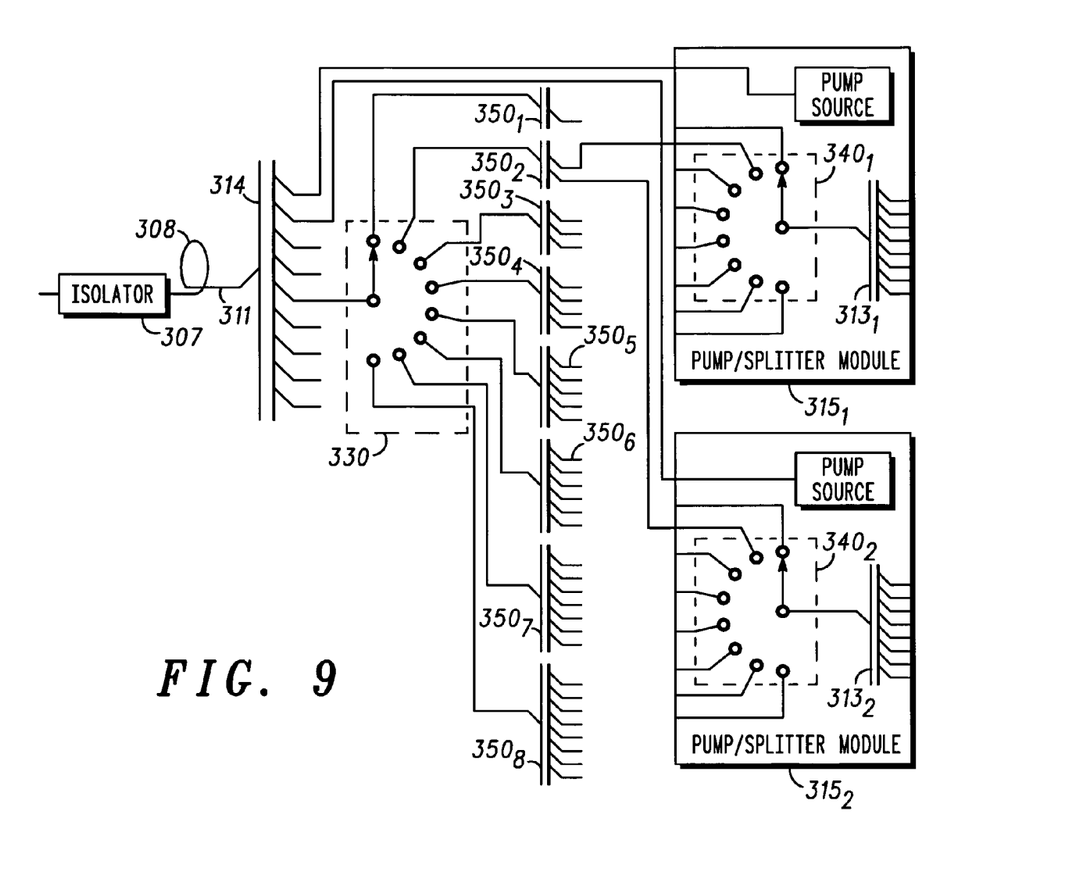
FIGS. 9-11 shows the arrangement of the switches employed in the hub depicted in FIG. 8 as additional two pump/splitter modules are inserted into the head end.

FIG. 9 shows the arrangement of switches 330 and 340 when two pump/splitter modules $315_1$ and $315_2$ are inserted into the head end. As shown, when the second module $315_2$ is added, optical switch 330 is switched to its second output position so that the amplified optical signal is directed to splitter $350_2$. In addition, optical switch $340_1$ in module $315_1$ and optical switch $340_2$ in module $315_2$ are both switched to their respective second input positions. In this way the portions of the amplified optical signal that are split between the two outputs of splitter $350_2$ are received by pump/splitter modules $315_1$ and $315_2$, respectively. The optical switches $340_1$ and $340_2$, in turn, direct the optical signals to their respective splitters $313_1$ and $313_2$.

Figure 10:
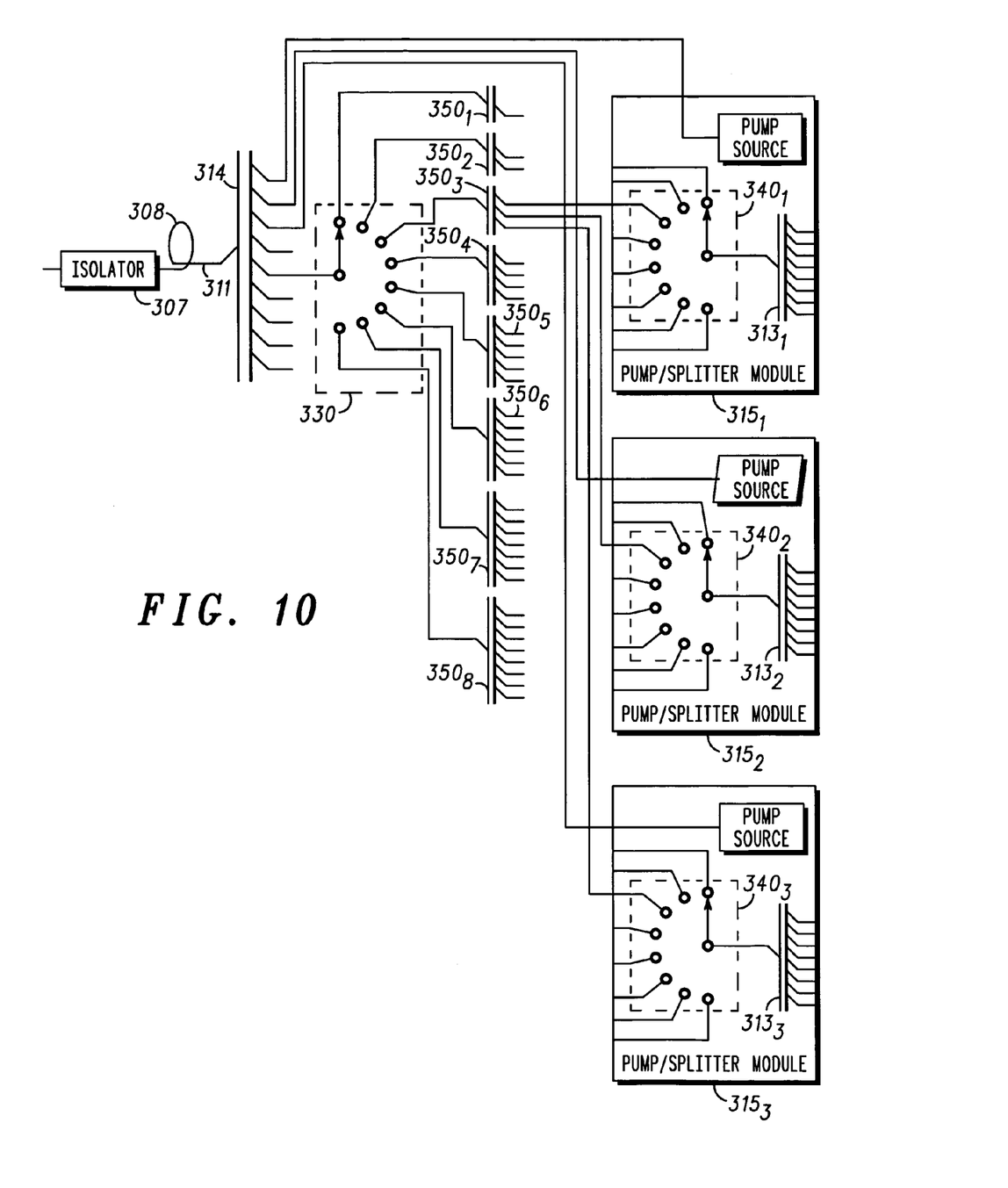
Figure 11:
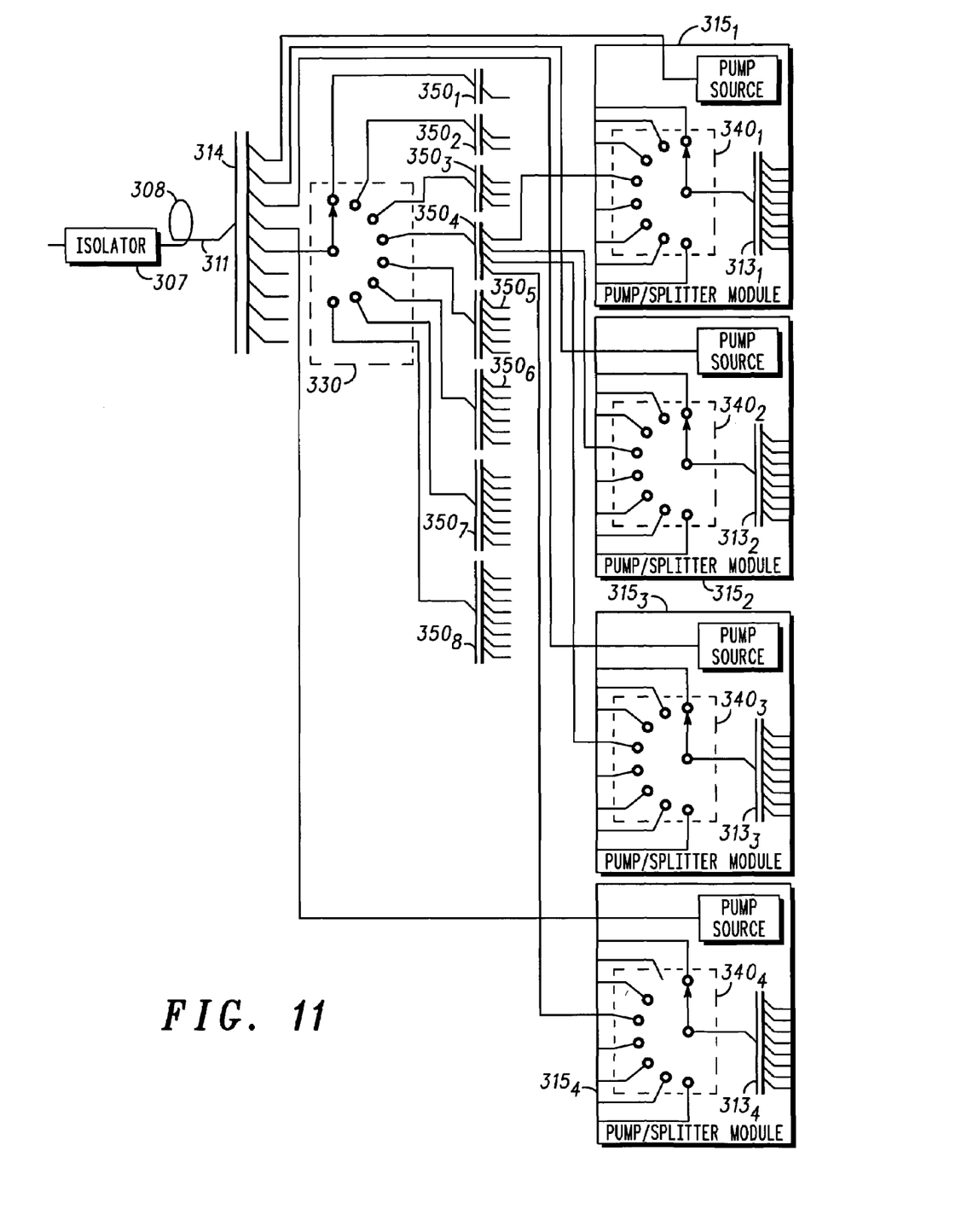

FIGS. 10-11 shows the arrangement of switches 330 and 340 as additional pump/modules 315 are added. For example, in FIG. 10, three pump/splitter modules $315_1$, $315_2$, and $315_3$ are employed. In this case optical switch 330 is switched to its third output position and optical switches $340_1$, $340_2$, and $340_3$ are switched to their third input position. Similarly, in FIG. 11, four pump/modules 315 are employed and the switches 330 and $340_1$, $340_2$, $340_3$, and $340_4$ are all in their fourth position.

As previously mentioned, one important advantage of the embodiment of the invention shown in FIGS. 8-11 is that if any given pump/splitter module 315 were to fail, the remaining pump/splitter modules would be unaffected. Another advantage of this embodiment of the invention arises if one of the splitters 350 should fail. For example, referring to FIG. 11, assume splitter $350_4$ fails so that the optical signals cannot be transmitted from splitter $350_4$ to the modules $315_1$, $315_2$, $315_3$, and $315_4$. In this case power can be restored to the modules by switching optical switch 330 and optical switches $340_1$, $340_2$, $340_3$ and $340_4$ to their fifth position. In this way the inoperable splitter $350_4$ is bypassed and instead splitter $350_5$ is used. Of course, in this configuration less optical signal power is directed to each of the modules 340 since the power is now being split five ways instead of four ways. Nevertheless, this is generally a minor sacrifice compared to the failure of all the pump/splitter modules, which would otherwise occur if the five-way splitter were not used to compensate for the failed four-way splitter.

Figure 12:
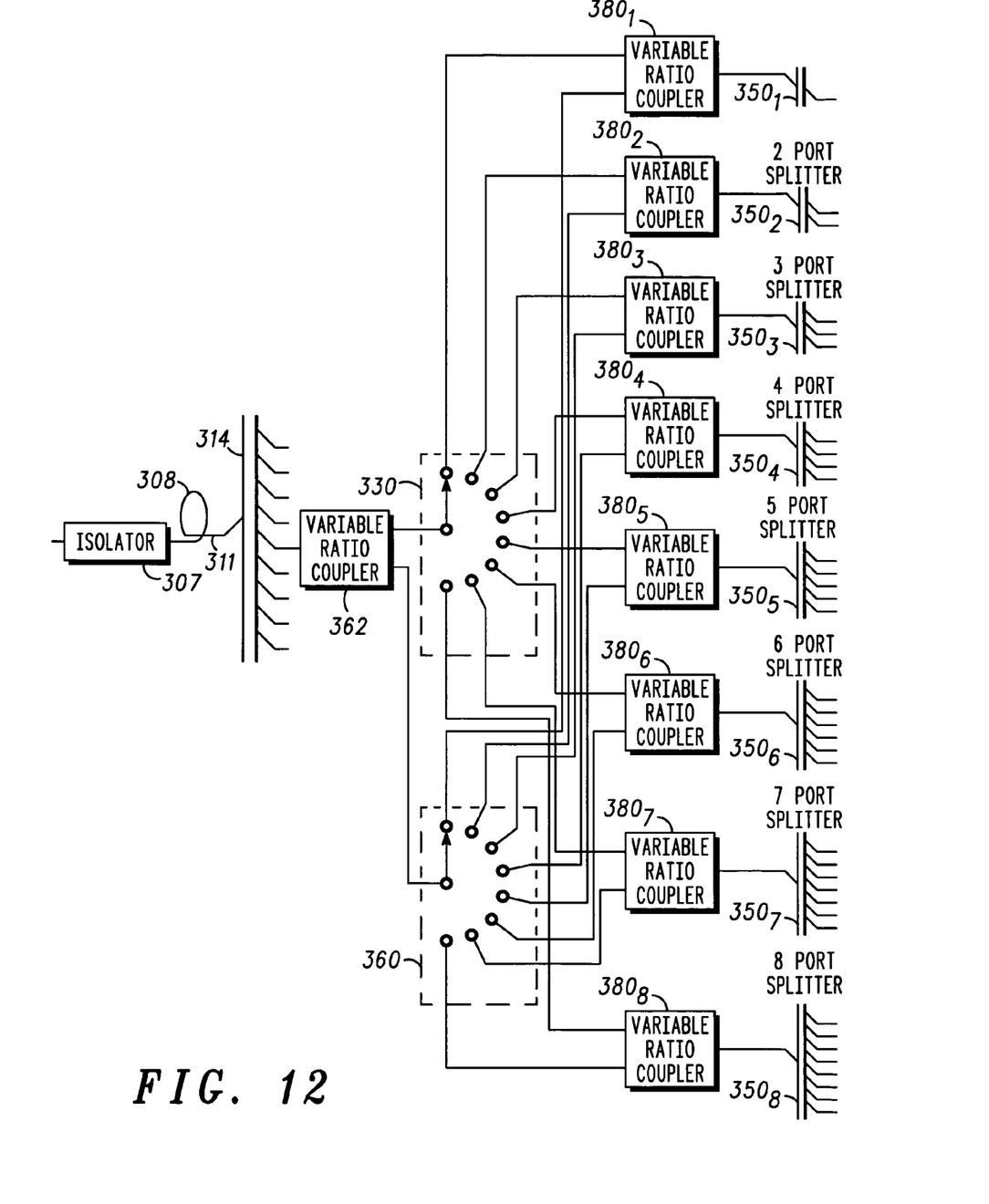
FIG. 12 shows yet another alternative embodiment of the hub constructed in accordance with the present invention.

One problem with the embodiment of the invention shown in FIGS. 8-11 is that if optical switch 330 should fail, none of the pump/splitter modules 315 will receive any signal power. FIG. 12 shows another embodiment of the invention that overcomes this problem by providing a degree of redundancy. Specifically, a second optical switch 360 is located in the head end chassis to which the optical signal can be diverted by a VRC 362 in the event that the optical switch 330 should fail. VRC 362 has an input that receives the amplified optical signal from doped fiber 308 along signal fiber 311. VRC 362 has two outputs that are respectively coupled to the inputs of optical switches 330 and 360. A series of VRCs 380 are also provided, which interconnect the outputs of switches 330 and 360 to the splitters 350, respectively. As shown, the VRCs 380 have two inputs and a single output. The outputs of optical switch 330 are respectively coupled to one of the inputs of the VRCs 380.

Similarly, the outputs of optical switch 360 are respectively coupled to the other input of the VRCs 380. The outputs of the VRCs 380 are respectively coupled to the inputs of the splitters 350. Although not shown in FIG. 12, the splitters 350 are connected to the pump/splitter modules 315 in the previously described manner.

Instead of VRCs 362 and 380, other switching elements may be employed, such as a 1×2 switch, for example. One advantage of a VRC over a 1×2 switch, however, is that the insertion loss of the VRC is lower.

In operation, the coupling ratio of VRC 362 is adjusted so that all the signal power is directed to optical switch 330. Likewise, the coupling ratio of VRCs 380 are adjusted so that all the signal power arriving from the outputs of switch 330 and received on the first input of the VRCs 380 are directed to the splitters 350. Should optical switch 330 fail, the coupling ratio of VRC 362 is adjusted so that all the signal power is directed to optical switch 360, Likewise, the coupling ratio of VRCs 380 are adjusted so that all the signal power arriving from the outputs of switch 360 and received on the second input of the VRCs 380 are directed to the splitters 350.

The invention claimed is:

1. A hub for use in a passive optical network (PON), comprising:
   a transmission fiber on which an information-bearing optical signal is received;
   a double-cladded, rare-earth doped fiber located along the transmission fiber for imparting gain to the information-bearing optical signal;
   a combiner having an output coupled to the transmission fiber and a plurality of inputs, said output being coupled to the transmission fiber such that optical energy at pump energy wavelengths but not signal wavelengths are communicated therebetween;
   at least one integrated pump source/splitter module optically coupled to one of the inputs of the combiner for providing optical pump energy to the double-cladded, rare-earth doped fiber; and
   a first optical splitter having an input receiving the amplified, information-bearing optical signal from the doped fiber and a plurality of outputs, at least one of said outputs being coupled to the integrated pump source/splitter module;
   a second optical splitter having an input coupled to a splitter output of the integrated pump source/splitter and a plurality of outputs for directing portions of the amplified, information-bearing optical signal to remote nodes in the PON.

2. The hub of claim 1 wherein said PON is CATV access network.

3. The hub of claim 1 wherein said rare-earth doped fiber is an erbium doped fiber.

4. The hub of claim 1 wherein said rare-earth doped fiber is an erbium and yttrium doped fiber.

5. The hub of claim 1 wherein said pump source is a multimode pump source.

6. The hub of claim 1 further comprising an initial optical amplifier providing the information-bearing optical signal onto the transmission fiber.

7. The hub of claim 1 further comprising a plurality of integrated pump source/splitter modules respectively coupled to the plurality of inputs of the combiner and the plurality of outputs of the first optical splitter.

8. A hub for use in a passive optical network (PON), comprising:
   a transmission fiber on which an information-bearing optical signal is received;
   a double-cladded, rare-earth doped fiber located along the transmission fiber for imparting gain to the information-bearing optical signal;
   a combiner having an output coupled to the transmission fiber and a plurality of inputs, said output being coupled to the transmission fiber such that optical energy at pump energy wavelengths but not signal wavelengths are communicated therebetween;
   at least one integrated pump source/splitter module optically coupled to one of the inputs of the combiner for providing optical pump energy to the double-cladded, rare-earth doped fiber; and
   a first variable ratio coupler (VRC) having first and second outputs and an input receiving the amplified, information-bearing optical signal from the doped fiber, a first of said outputs of the VRC being coupled to a splitter input of the integrated pump source/splitter module;
   an optical splitter having an input coupled to a splitter output of the integrated pump source/splitter module and a plurality of outputs for directing portions of the amplified, information-bearing optical signal to remote nodes in the PON.

9. The hub of claim 8 further comprising:
   a second integrated pump source/splitter module optically coupled to a second of the inputs of the combiner for providing optical pump energy to the double-cladded, rare-earth doped fiber; and
   a second VRC having an input coupled to the second output of said first VRC for receiving therefrom an unused portion of the amplified, information-bearing optical signal, said second VRC having first and second outputs, one of said outputs of the second VRC being coupled to a splitter input of the second integrated pump source/splitter module.

10. The hub of claim 9 wherein the first VRC is located in the pump source/splitter module.

11. The hub of claim 10 wherein the second VRC is located in the second pump source/splitter module.

12. The hub of claim 8 further comprising:
   an optical tap coupling a portion of optical signal power from the first output of the first VRC;
   a photodetector receiving the optical signal power from the optical tap and monitoring the power level of the optical signal;
   a controller coupled to the photodetector and the first VRC for adjusting a coupling ratio of the first VRC based on the optical signal power level received by the photodetector.

13. The hub of claim 12 wherein the first VRC, the optical tap, the photodetector and the controller are located in the pump source/splitter module.

14. The hub of claim 8 wherein the first VRC is located in the pump source/splitter module.

15. The hub of claim 8 wherein said PON is CATV access network.

16. The hub of claim 8 wherein said rare-earth doped fiber is an erbium doped fiber.

17. The hub of claim 8 wherein said rare-earth doped fiber is an erbium and yttrium doped fiber.

18. The hub of claim 8 wherein said pump source is a multimode pump source.

19. The hub of claim 8 further comprising an initial optical amplifier providing the information-bearing optical signal onto the transmission fiber.

20. A hub for use in a passive optical network (PON), comprising:

a transmission fiber on which an information-bearing optical signal is received;

a double-cladded, rare-earth doped fiber located along the transmission fiber for imparting gain to the information-bearing optical signal;

a combiner having an output coupled to the transmission fiber and a plurality of inputs, said output being coupled to the transmission fiber such that optical energy at pump energy wavelengths but not signal wavelengths are communicated therebetween;

at least one integrated pump source/splitter module optically coupled to one of the inputs of the combiner for providing optical pump energy to the double-cladded, rare-earth doped fiber, said module including a pump source, a first optical splitter and a first 1×N optical switch having N inputs, where N is an integer greater than or equal to two, and an output coupled to an input of the optical splitter; and a second 1×N optical switch having N outputs and an input receiving the amplified, information-bearing optical signal from the doped fiber;

(N−1) second optical splitters each having an input respectively coupled to one of the outputs of the second optical switch, wherein each of the second optical splitters i, where i=1 to (N−1), have i+1 outputs, wherein each input of the first optical switch is sequentially coupled to an output of a different one of the second optical splitters; and a third optical splitter having an input coupled to a splitter output of the first optical splitter in the integrated pump source/splitter module and a plurality of outputs for directing portions of the amplified, information-bearing optical signal to remote nodes in the PON.

21. The hub of claim 20 wherein a remaining one of the N outputs of the second optical switch is coupled to a remaining one of the N inputs of the first optical switch.

22. The hub of claim 20 wherein said at least one pump source/splitter module comprises M pump source/splitter modules, where M is an integer less than or equal to N, each input of the first optical switch in each of said M modules is sequentially coupled to an output of one of the second optical splitters.

23. The hub of claim 20 wherein said PON is CATV access network.

24. The hub of claim 20 wherein said rare-earth doped fiber is an erbium doped fiber.

25. The hub of claim 20 wherein said rare-earth doped fiber is an erbium and yttrium doped fiber.

26. The hub of claim 20 wherein said pump source is a multimode pump source.

27. The hub of claim 20 further comprising an initial optical amplifier providing the information-bearing optical signal onto the transmission fiber.

28. A hub for use in a passive optical network (PON), comprising:

a transmission fiber on which an information-bearing optical signal is received;

a double-cladded, rare-earth doped fiber located along the transmission fiber for imparting gain to the information-bearing optical signal;

a combiner having an output coupled to the transmission fiber and a plurality of inputs, said output being coupled to the transmission fiber such that optical energy at pump energy wavelengths but not signal wavelengths are communicated therebetween;

at least one integrated pump source/splitter module optically coupled to one of the inputs of the combiner for providing optical pump energy to the double-cladded, rare-earth doped fiber, said module including a pump source, a first optical splitter and a first 1×N optical switch having N inputs, where N is an integer greater than or equal to two, and an output coupled to an input of the optical splitter; and a first switching element having 2 outputs and an input receiving the amplified, information-bearing optical signal from the doped fiber;

second and third 1×N optical switches each having N outputs and input coupled to one of the outputs of the first switching element;

(N−1) second switching elements each having two inputs and an output, a first input of each of the second switching elements being respectively coupled to one of the outputs of the second optical switch and a second input of each of the second switching elements being respectively coupled to one of the outputs of the third optical switch;

(N−1) second optical splitters each having an input respectively coupled to the output of the (N−1) second switching elements, wherein each of the second optical splitters i, where i=1 to (N−1), have i+1 outputs, wherein each input of the first optical switch is sequentially coupled to an output of a different one of the second optical splitters; and a third optical splitter having an input coupled to a splitter output of the first optical splitter in the integrated pump source/splitter module and a plurality of outputs for directing portions of the amplified, information-bearing optical signal to remote nodes in the PON.

29. The hub of claim 28 wherein a remaining one of the N outputs of the second optical switch is coupled to a remaining one of the N inputs of the first optical switch.

30. The hub of claim 28 wherein said at least one pump source/splitter module comprises M pump source/splitter modules, where M is an integer less than or equal to N, each input of the first optical switch in each of said M modules is sequentially coupled to an output of one of the second optical splitters.

31. The hub of claim 28 wherein said PON is CATV access network.

32. The hub of claim 28 wherein said rare-earth doped fiber is an erbium doped fiber.

33. The hub of claim 28 wherein said rare-earth doped fiber is an erbium and yttrium doped fiber.

34. The hub of claim 28 wherein said pump source is a multimode pump source.

35. The hub of claim 28 further comprising an initial optical amplifier providing the information-bearing optical signal onto the transmission fiber.

36. The hub of claim 28 wherein said first switching element is a VRC.

37. The hub of claim 36 wherein said second switching elements are VRCs.

38. The hub of claim 28 wherein said second switching elements are VRCs.

39. The hub of claim 28 wherein said first switching element is a 1×2 switch.

40. The hub of claim 39 wherein said second switching elements are 1×2 switches.

41. The hub of claim 28 wherein said second switching elements are 1×2 switches.

* * * * *

UNITED STATES PATENT AND TRADEMARK OFFICE
CERTIFICATE OF CORRECTION

PATENT NO.        : 7,366,416 B2  
APPLICATION NO.   : 10/638954  
DATED             : April 29, 2008  
INVENTOR(S)       : Ramachandran et al.

Page 1 of 1

It is certified that error appears in the above-identified patent and that said Letters Patent is hereby corrected as shown below:

On the Title Page in Item (58), under "Field of Classification Search", in Column 1, Line 2, after "83," please delete "24, 39,".

Signed and Sealed this

Eighth Day of September, 2009

David J. Kappos  
*Director of the United States Patent and Trademark Office*